US012675325B2

(12) United States Patent
Sousa et al.

(10) Patent No.: US 12,675,325 B2
(45) Date of Patent: Jul. 7, 2026

(54) PIPELINE FOR RESOURCE AWARE WORKLOAD PLACEMENT USING A EUCLIDEAN-BASED PROJECTION METHOD

(71) Applicant: Dell Products L.P., Round Rock, TX (US)

(72) Inventors: Eduardo Vera Sousa, Rio de Janeiro (BR); Hugo de Oliveira Barbalho, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 709 days.

(21) Appl. No.: 17/659,604

(22) Filed: Apr. 18, 2022

(65) Prior Publication Data

US 2023/0333893 A1 Oct. 19, 2023

(51) Int. Cl.
*G06F 9/50* (2006.01)

(52) U.S. Cl.
CPC .......... *G06F 9/50* (2013.01); *G06F 2209/503* (2013.01)

(58) Field of Classification Search
CPC .... G06F 9/50; G06F 9/5027; G06F 2209/501; G06F 2209/503
See application file for complete search history.

(56) References Cited

U.S. PATENT DOCUMENTS

| 8,601,471 B2 * | 12/2013 | Beaty | G06F 9/45558 |
| | | | 718/1 |
| 11,379,375 B1 | 7/2022 | Gottin et al. | |

| 2007/0250837 A1 * | 10/2007 | Herington | G06F 9/50 |
| | | | 718/105 |
| 2013/0219068 A1 * | 8/2013 | Ballani | G06Q 10/063 |
| | | | 709/226 |
| 2013/0290536 A1 * | 10/2013 | Dutta | G06F 9/5027 |
| | | | 709/226 |
| 2018/0239633 A1 * | 8/2018 | Li | G06F 9/45558 |
| 2020/0151018 A1 * | 5/2020 | Jha | G06F 9/4856 |
| 2020/0364086 A1 * | 11/2020 | Gavali | G06F 11/3414 |
| 2020/0382437 A1 * | 12/2020 | Srinivasan | G06N 5/04 |

OTHER PUBLICATIONS

Lee, Sangmin et al. "Validating Heuristics for Virtual Machines Consolidation." Published 2011, pp. 1-14. (Year: 2011).*
M. G. R. Thomas A. Feo, Greedy randomized adaptive search procedures, 1995.

* cited by examiner

*Primary Examiner* — Lewis A Bullock, Jr.
*Assistant Examiner* — Carlos Alberto Espana
(74) *Attorney, Agent, or Firm* — Workman Nydegger

(57) ABSTRACT

One example method includes determining a respective metric value for each computing resource in a group of computing infrastructures, and each metric value comprises a length of a Euclidean projection of a required resources vector in a respective vector of available resources provided by one of the computing infrastructures. Next, a list is created that includes the computing infrastructures, and the list is sorted according to one of two criteria. A restricted candidates list is created that is a subset of the list, and one of the computing infrastructures is randomly selected from the restricted candidates list. Finally, the method includes executing, with whichever computing infrastructure was randomly selected, a workload associated with the required resources vector.

12 Claims, 7 Drawing Sheets

100

200

MinimumVMsPlacement - 10 workloads for 2 VMS - Error: 0.00

Projection metric for Minimum Active Devices approach
for 10 workloads allocated in 2 VMs

LoadBalancePlacement - 10 workloads for 2VMS - Error: 0.00

Projection metric for Load Balance approach for 10 workloads
allocated in 2 VMs.

MinimumVMsPlacement - 15 workloads for 4 VMS - Error: 0.00

Projection metric for Minimum Active Devices approach
for 15 workloads allocated in 4 VMs. Notice that one of
the VMs is turned off during the entire simulation.

LoadBalancePlacement - 15 workloads for 4 VMS - Error: 0.00

Projection metric for Load Balance approach for 15 workloads
allocated in 4 VMs.

MinimumVMsPlacement - 35 workloads for 8 VMS - Error: 0.00

Projection metric for Minimum Active Devices approach
for 35 workloads allocated in 8 VMs. Notice that there
are VMs turned off during the entire simulation.

LoadBalancePlacement - 35 workloads for 8 VMS - Error: 0.00

Projection metric for Load Balance approach for 35 workloads
allocated in 8 VMs.

MinimumVMsPlacement - 35 workloads for 16 VMS - Error: 0.00

Projection metric for Minimum Active Devices approach
for 35 workloads allocated in 16 VMs. Notice that most
of the VMs turned off during the entire simulation.

LoadBalancePlacement - 35 workloads for 16 VMS - Error: 0.00

Projection metric for Load Balance approach for 35 workloads
allocated in 16 VMs.

PIPELINE FOR RESOURCE AWARE WORKLOAD PLACEMENT USING A EUCLIDEAN-BASED PROJECTION METHOD

FIELD OF THE INVENTION

Embodiments of the present invention generally relate to resource allocation in a computing environment. More particularly, at least some embodiments of the invention relate to systems, hardware, software, computer-readable media, and methods for workload placement using an optimization-based method that leverages a metric based on vector projection in Euclidean space to consider multiple resources in the optimization of workload placement and resource usage.

BACKGROUND

Using a computing infrastructure to efficiently execute jobs while respecting Service Level Agreements (SLAs) and, thus, guaranteeing Quality of Service (QoS), poses several challenges. One of such challenges lies in the fact that SLAs are typically set before the execution of a job, and assume availability of the resources needed to meet the SLAs. In fact however, the prospective job execution environment may be subject to several possible disturbances that were unknown or not considered when the SLA was set, such as poor knowledge about actual resource necessity, demand peaks, and hardware malfunctions, for example. The challenge is greater in data center environments in which the configuration of the nodes may differ and there may be restrictions over gathering information for management and orchestration of resources. Moreover, since different workloads have different bottlenecks, some workloads are better executed in some environments than others. Some of these problems are addressed in further detail below.

One challenge concerns ensuring that SLAs are met in dynamic environments with static resources. More particularly, it may be challenging to meet all contracts made with several customers. Even though some knowledge of future workloads could exist, and some demand prediction engines exist, there are always errors, which may turn the task of respecting all SLAs unfeasible in a given environment. Furthermore, the execution of new workloads may impact the execution time of other workloads that are already running. Recently added devices to infrastructures or the unavailability of devices, such as due to malfunctions for example, may also lead to SLA violations.

Another challenge with conventional approaches relates to the efficient execution of a pool of workloads. Particularly, one solution to ensure SLAs may be to dedicate several resources to a particular job. This solution might lead to 100% fulfillment of SLAs but is not cost-effective. Further, workloads might have different necessities, for example, workloads may be intensive on a single resource but not on others. To dedicate devices for some workloads is not suitable in both ends of the demand spectrum. On one hand, there is the situation when demand is low and dedicating resources is possible, but not cost-effective. On the other side of the spectrum, if demand is high, dedicating resources will lead to fewer workloads executed over time, which reduces the overall throughput of the provider, and this is reflected in less revenue generated.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
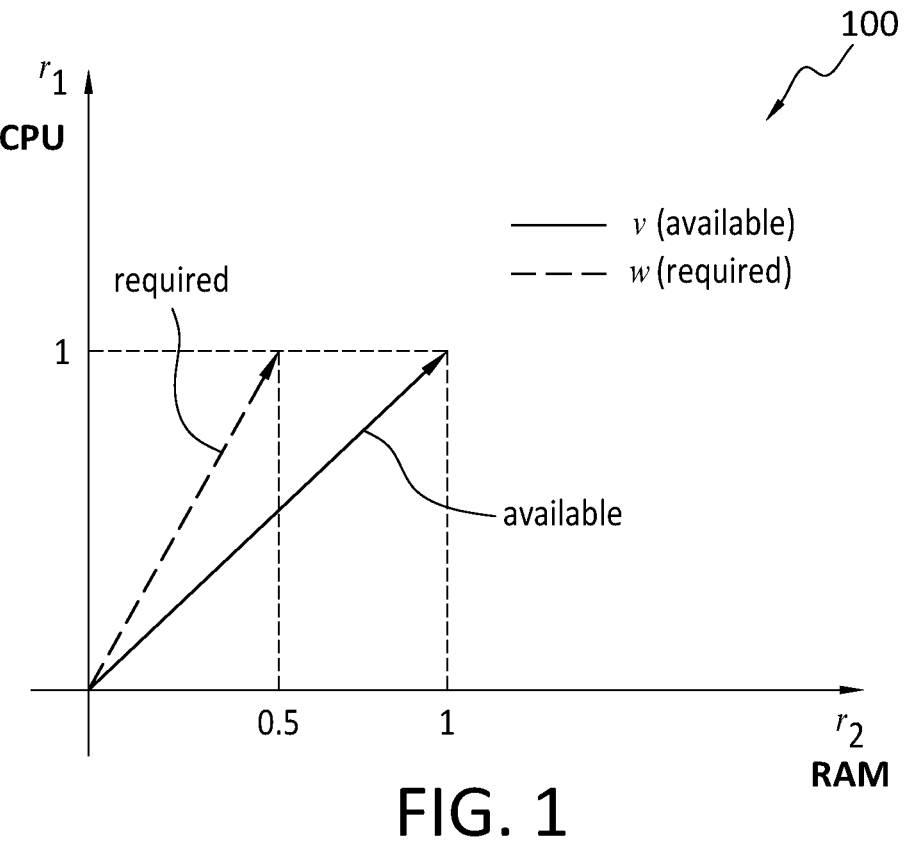
FIG. 1 discloses a space S denoting the resources of the infrastructure I.

Embodiments of the present invention generally relate to resource allocation in a computing environment. More particularly, at least some embodiments of the invention relate to systems, hardware, software, computer-readable media, and methods for workload placement using an optimization-based method that leverages a metric based on vector projection in Euclidean space to consider multiple resources in the optimization of workload placement and resource usage.

Some example embodiments may employ a metric for workload placement in an environment that is constrained in terms of the resources available for workload execution. The metric may be based on a vector projection considering a Euclidean space. Each dimension of this space may encode the resources available in a workload execution infrastructure. To illustrate, a 2-dimensional space S could represent the number of CPU cores (dimension 1) and amount of RAM (dimension 2) available in a given infrastructure I. The space S may thus represent the percentage of available resources in a given infrastructure I. A vector w in the space S may represent a workload to be executed in the infrastructure, and a vector v in the space S may represent the availability of resources in the space S. By obtaining the orthogonal projection of the vector w in v, the length of the resulting projection is the metric for workload placement tasks in the space S.

By using this metric, embodiments may operate to choose between two scenarios. The first scenario may prioritize having the minimum devices working simultaneously in the infrastructure, and the second scenarios may prioritize load balance across the entire infrastructure. In the first scenario, embodiments may aim to maximize the projection of the vector win v. On the other hand, in the second scenario, embodiments may aim to minimize the projection of the vector w in v.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may optimize workload placement in dynamic execution environments that are constrained by fixed resources, while still respecting an applicable SLA. An embodiment may reduce the dimensionality of a multi-dimensional workload placement problem. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Cloud computing has gained the attention of businesses because of its benefits, which include pay-per-use computation at the customer side and resource sharing at the provider side. Through virtualization, the main technology behind clouds, it is possible to abstract a pool of computation devices and offers computational resources better tailored to customer needs, who might contract more computation as their needs grow and change. In this environment, other resource abstractions have emerged, the most prominent example being containers. It is also possible to offer computation without the explicit necessity of the customer to know which underlying infrastructure is running its code. This can be achieved in the Platform as a Service (PaaS) paradigm, and also the Function as a Service (FaaS, serverless computing) paradigm.

In each of these paradigms, the usual agreements upon the quality of service (QoS) expected by the customer are expressed through several Service Level Agreements (SLAs). These typically include response time, execution time, uptime percentage, among other metrics. The SLAs are usually agreed upon, prior to provision of the service, through reference target metrics values. Providers aim at respecting these targets to avoid contractual fines. Furthermore, failing to meet the targets also diminishes the perceived trust of the provider by the customer.

One way to ensure that SLAs are met is to dedicate a large, static, amount of resources to each customer. There are at least two problems with this approach. Firstly, in general, the needs of an application cannot be assumed to be bounded by any one particular resource. Some applications, for example, might have an IO-intensive phase and, afterward, a compute-intensive phase. Dedicating a large amount of all resources to an application is often inefficient, resulting in spare resources, that could otherwise be assigned to other processes, at the different phases of the application. Secondly, the initial guess on how much resources are needed to run an application might be over, or under, estimated.

Another aspect of excessive resource allocation is that of the restrictions that such allocation imposes on the provider service. Assuming a provider with a large pool of computational resources, any particular application does not need to be concerned about resource constraints, that is, from the point of view of the application, more resources are always available within reasonable limits established by the SLA. However, from the point of view of the provider who deals with many customers concurrently, the volume of spare resources dictates how many jobs can be run in parallel while still respecting SLAs. In this sense, optimizing the adaptation of resource allocation of a single job impacts the overall efficiency of the system.

In opposition to SLAs, which are set before the execution of a job and tend not to change significantly, the execution environment for those jobs is typically quite dynamic. New workloads might come and compete for resources and unplanned demand peaks might occur, which might disrupt the original workload planning due to tasks with higher priorities, greater need to share the environment, and overheads because of context switching. Service providers always aim to provide services to their customers respecting SLAs and minimizing resource usage. This is the scenario that provides the optimal profit for them. To do so, a static approach of resource allocation, which dedicates resources to a job from its start through its completion, is naturally inefficient, and, thus, sub-optimal.

B. Aspects of Example Embodiments

In general, example embodiments of the invention may include a pipeline for workload placement using an optimization-based method that leverages a metric based on vector projection in Euclidean space to consider multiple resources, such as CPU and RAM for example, in the optimization. To this end, embodiments may provide for the definition and use of a metric for workload placement.

Note that while reference is made herein to the use of VMs for execution of one or more workloads, the scope of the invention is not limited to VMs. More generally, any system or entity, which may comprise hardware and/or software, capable of executing a workload may be employed in embodiments of the invention. As such, reference may be made herein generally to the use of a 'worker' or 'workers' or 'computing infrastructure' for execution of one or more workloads. A VM is but one example implementation of such a 'worker' or 'computing infrastructure.'

B.1 Metric for Workload Placement

Example embodiments of such a metric may be based on a vector projection considering a Euclidean space. Each dimension of this space encodes the resources available in an infrastructure. In an example configuration, a 2-dimensional space S could represent the number of CPU cores and amount of RAM available in a given infrastructure I. Notice that this space may have different scaling across the dimensions. Thus, in order to prevent metric abnormalities when dealing with projections, embodiments may assume all dimensions have relative values in the range [0,1]. A consequence of this approach may be that the space S represents the percentage of available resources in a given infrastructure I.

Let v denote a vector in a 2-dimensional space S representing the initial state of an infrastructure I, considering the percentage of resources r1 and r2 available in this infrastructure. Consider now a vector w in this same space S denoting the requirements, in terms of resources, of a workload W to meet the SLA requirements. This configuration is disclosed in FIG. 1 which indicates a space S that denotes the resources of the infrastructure I.

Particularly, FIG. 1 depicts one example of infrastructure 100 with all resources available. Note both resources r1, such as CPU for example, and r2, such as RAM for example, are projected at 1.0. Put another way, those two resources are fully available, no portion of either resource having yet been consumed or allocated to a workload. Thus, the 'available' vector in FIG. 1 may indicate an initial state of the infrastructure 100 before any workloads have been placed in it, or after all workloads have been completed, and the resources released.

In FIG. 1, the 'required' vector, w, presents the workload W requirements needed for execution of the workload W while meeting the SLA requirements. In this illustrative example, the requirements are expressed in terms of CPU and RAM, but the scope of the invention is not limited to any particular resource(s). Any other resources that may be employed in the execution of a workload W may be the subject of embodiments of the invention. In the particular example of FIG. 1 then, the workload W requires, for SLA compliance, all (100%) of available resource r1, and half (50%) of the available resource r2.

Figure 2:
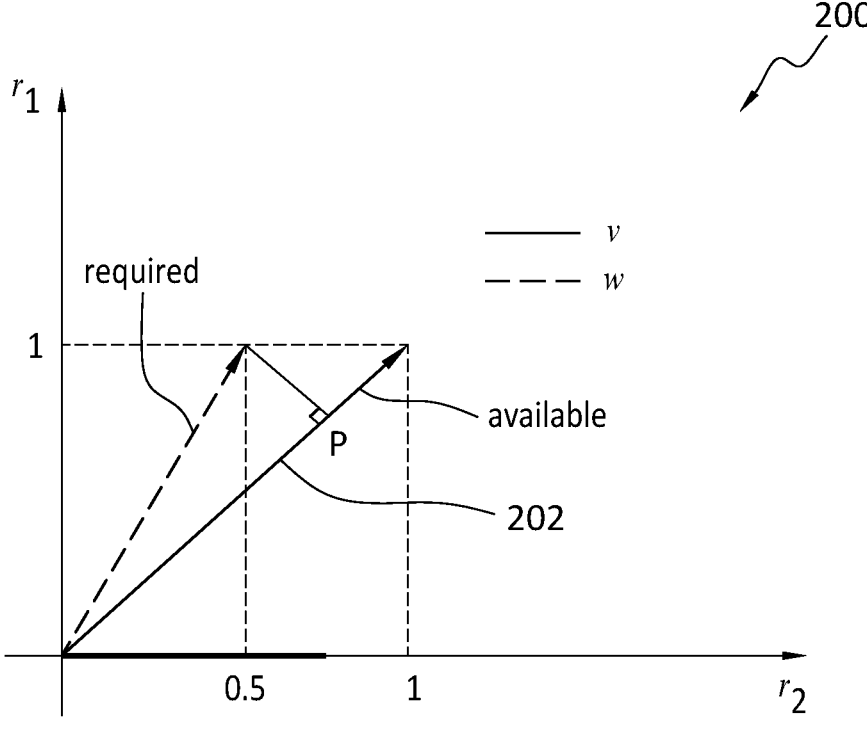
FIG. 2 discloses a Space S considering the orthogonal projection of w in v.

With reference now to FIG. 2, where the example infrastructure is denoted at 200, by obtaining the orthogonal projection 202 of the vector w ('required') in v ('available') depicted in FIG. 2, the length of the resulting projection 202 is the metric for workload placement tasks in the infrastructure 200. That is, the length of the projection 202 may indicate the extent to which the two resources r1 and r2 are allocated to the workload W. This metric may be readily extended for an n-dimensional version, where an infrastructure is described by more than two resources. Note that resource allocations, such as the examples in FIG. 2, may be optimized, given the workload W to be performed and the resources available in the infrastructure 200, but those resource allocations may not necessarily be all that is required to meet an SLA for the workload W.

Particularly, it can be seen in the example of FIG. 2 that point 'p' indicates that there is adequate resource r2 (approximately 0.75) to fully meet the requirements of the workload W (requires 0.5 for resource r2), but less than adequate resource r1 (approximately 0.8) to fully meet the requirements of the workload W (requires 1.0 for resource r1). In any case, the coordinates of point 'p' in this illustrative 2-dimensional example indicate an extent to which the resources r1 and r2 have been consumed by, or at least allocated to, the workload W. Correspondingly, the coordinates of point 'p' in this illustrative 2-dimensional example also indicate an extent to which any remaining resources r1 and r2 may still be available after placement of the workload W in the infrastructure 200. As discussed in more detail below, the length of the projection 202 may be used as a basis to perform various optimizations, such as minimizing resource consumption in the infrastructure, or maximizing the workload(s) placed in the infrastructure.

With continued reference to FIG. 2, a metric defined as the length of the projection of w in v can be more formally defined as: $\|proj_v w\| = (w \cdot v)/(\|v\|)$, where $\|v\|$ represents the L2-norm of v. Such metric, when used alongside a Multi-Dimensional Bin Packing (MDBP) heuristic may provide reduction on the dimensionality of the problem in a way that the entire problem can be mapped to a regular Bin Packing (BP) problem. As can be seen in the experiments, discussed below, this approach provided good results for workload placement tasks considering both Minimum Active Devices and Load Balance scenarios.

B.2 Framework for Workload Placement

It is noted that the workload placement problem described initially can be represented as a Multi-Dimensional Bin Packing (MDBP) problem. See, e.g., M. G. R. Thomas A. Feo, *Greedy Randomized Adaptive Search Procedures,* 1995. The classic bin packing optimization problem is one in which items of different sizes are packed in a finite number of containers of fixed size. The heuristics for this MDBP, however, can be costly. Moreover, the problem becomes more difficult if there are not any specific constraints for it. By leveraging the metric presented herein, embodiments may be able to map the MDBP problem to a regular Bin Packing (BP) problem.

Considering the example provided in FIGS. 1 and 2, it is noted that the initial 2-dimensional space of the two resources r1 and r2 was mapped to a scalar, or a single, value, that is, the length of the projection 202 that terminates at point 'p' in FIG. 2. The same behavior may be expected to be observed in any 'n' dimensionality, that is, with any number 'n' of resources, where 'n' is any integer equal to, or greater than, one (1).

Figure 3:
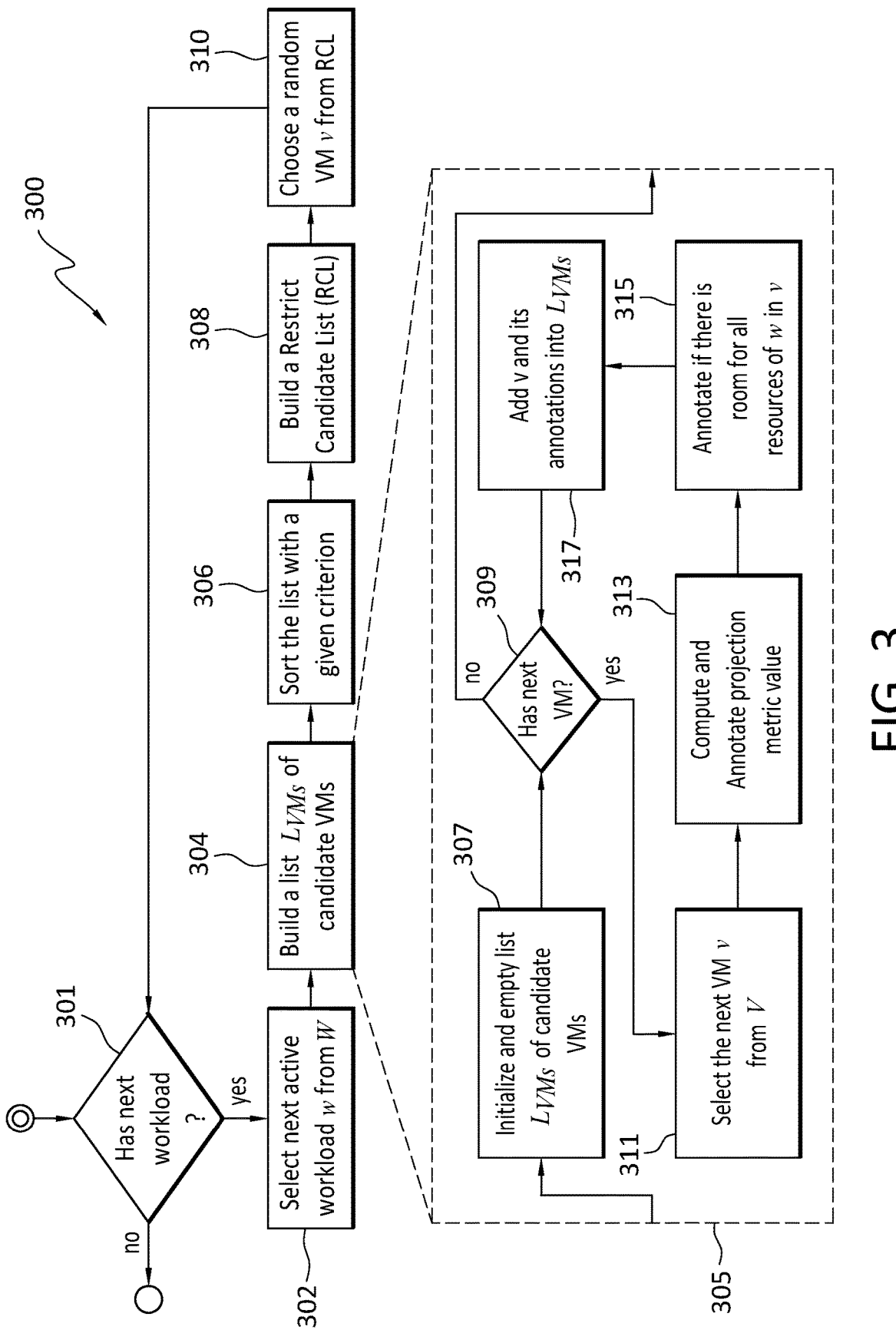
FIG. 3 discloses an example workload placement pipeline.
Figure 4:
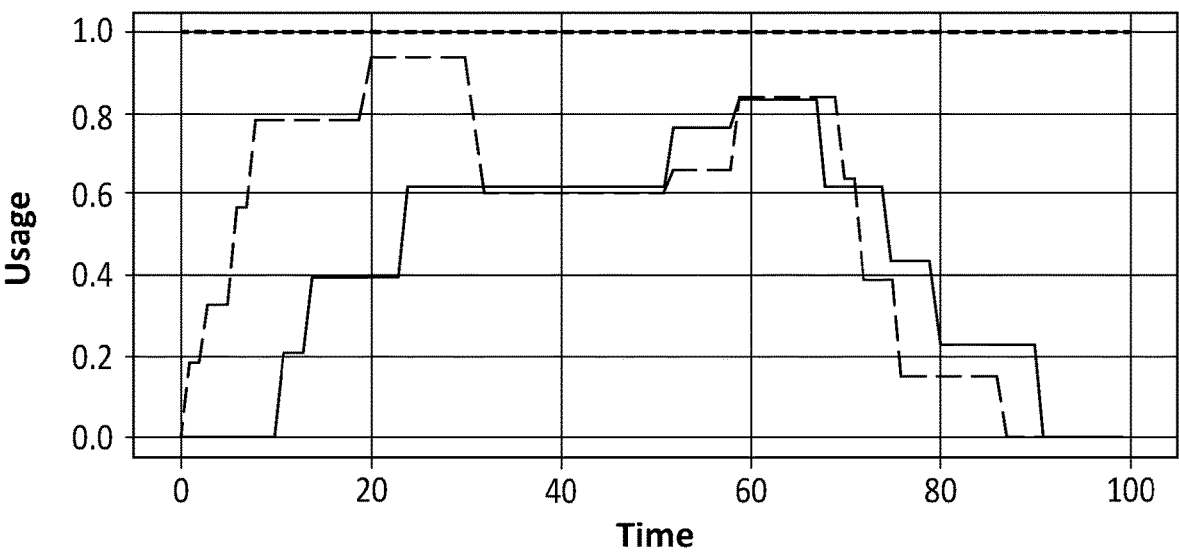
FIG. 4 discloses a projection metric for the Minimum Active Devices approach for 10 workloads allocated in 2 VMs.
Figure 5:
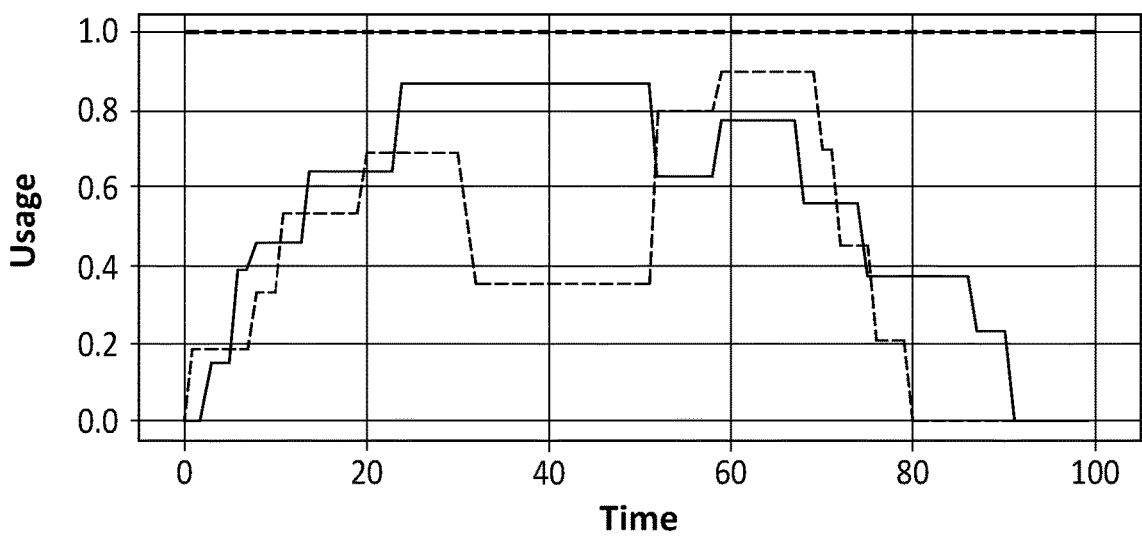
FIG. 5 discloses a projection metric for Load Balance approach for 10 workloads allocated in 2 VMs.
Figure 6:
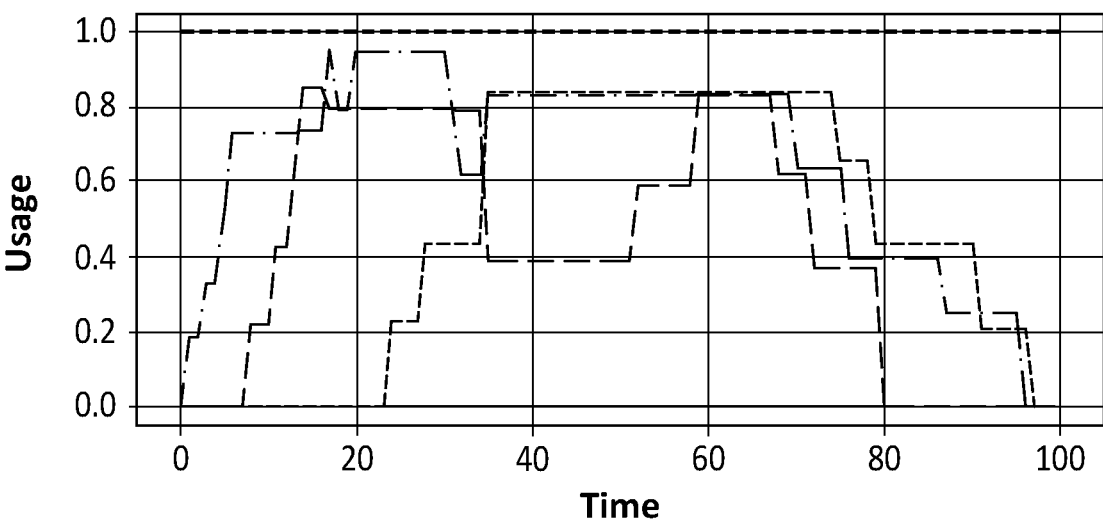
FIG. 6 discloses a projection metric for Minimum Active Devices approach for 15 workloads allocated in 4 VMs (note that one of the VMs is turned off during the entire simulation).
Figure 7:
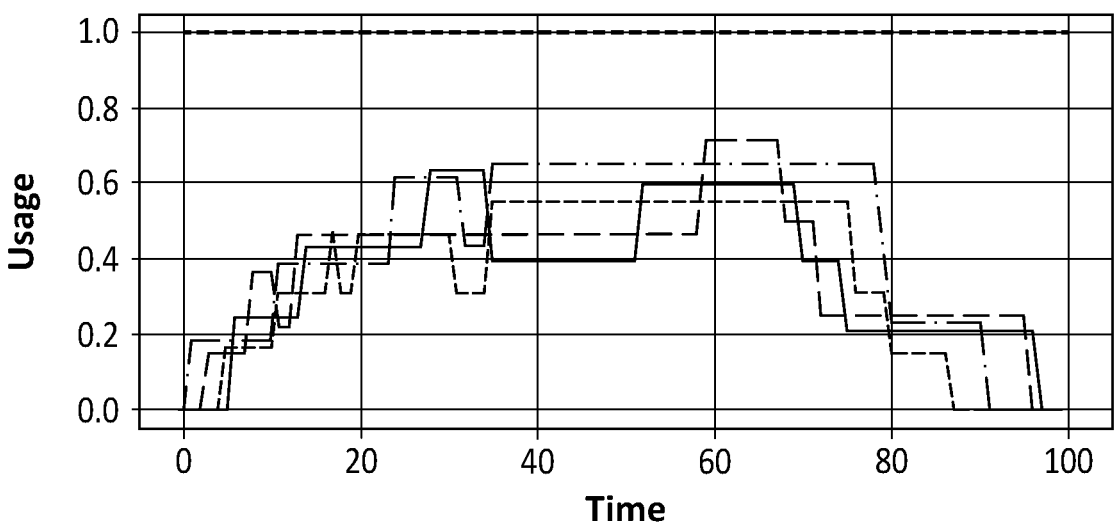
FIG. 7 discloses a projection metric for the Load Balance approach for 15 workloads allocated in 4 VMs.
Figure 8:
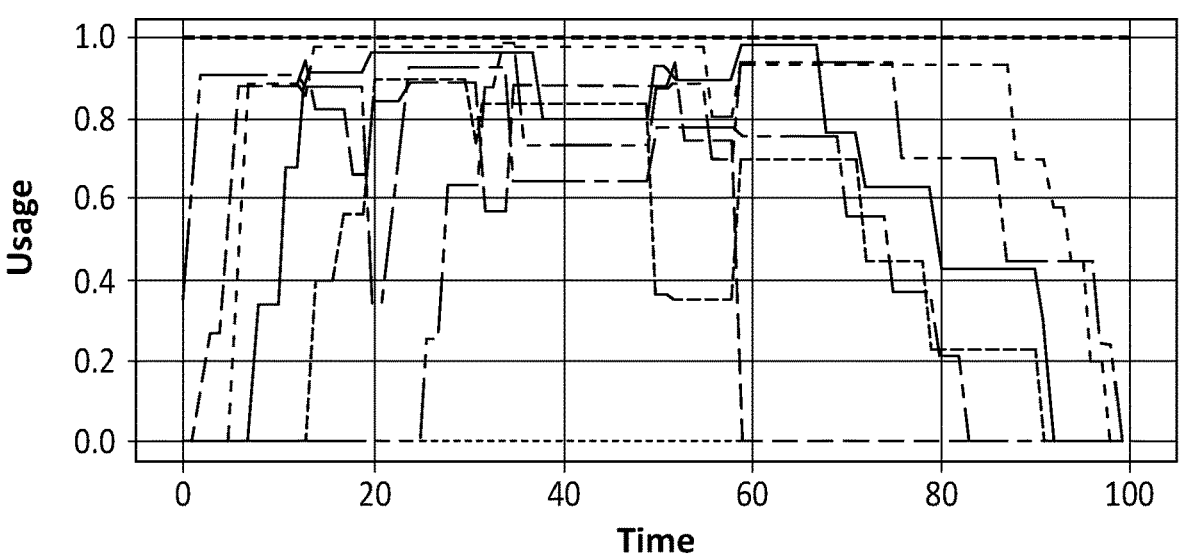
FIG. 8 discloses a projection metric for the Minimum Active Devices approach for 35 workloads allocated in 8 VMs (note that there are VMs turned off during the entire simulation).
Figure 9:
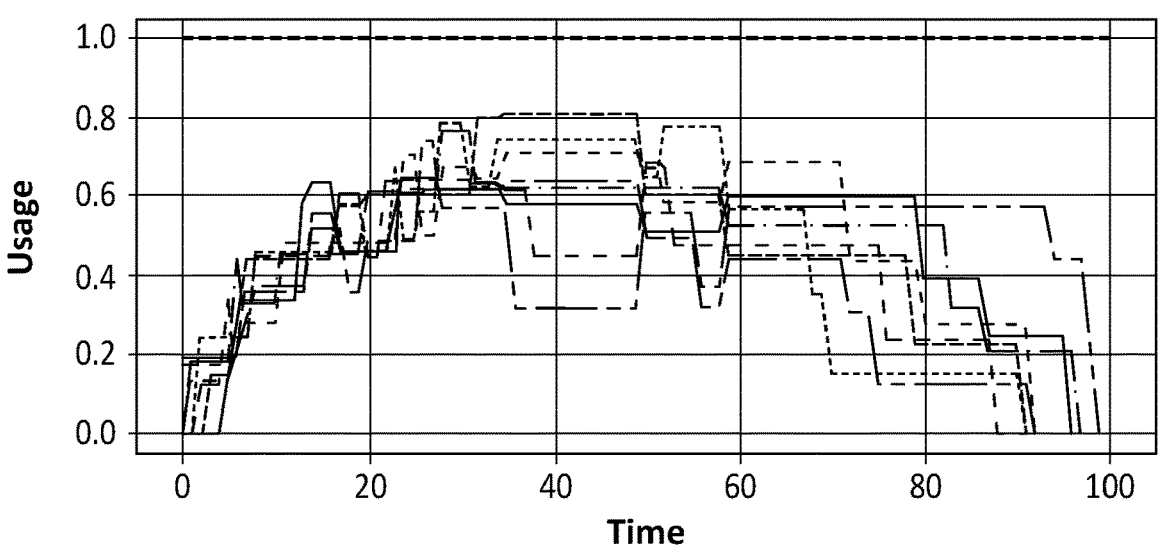
FIG. 9 discloses a projection metric for the Load Balance approach for 35 workloads allocated in 8 VMs.
Figure 10:
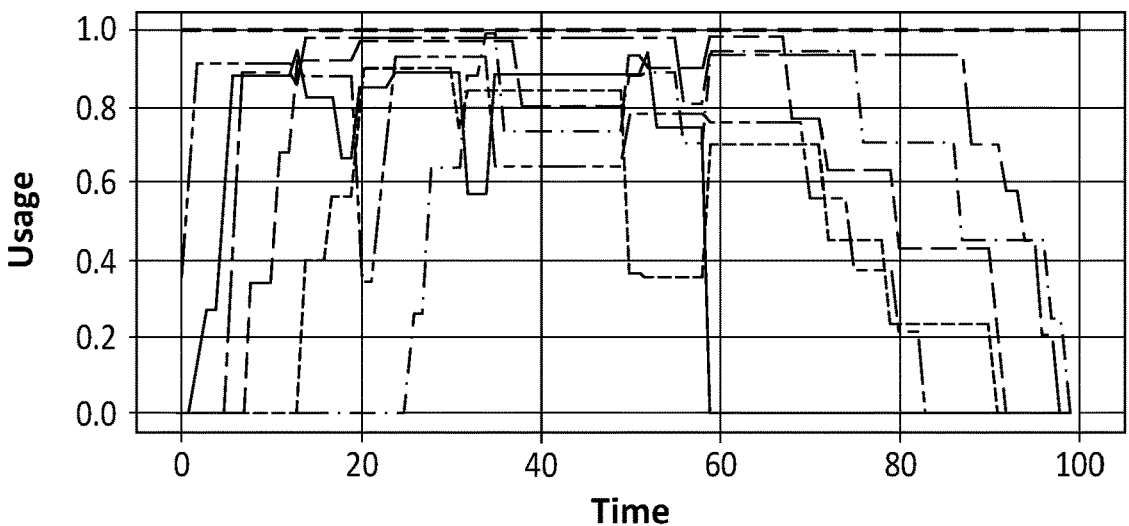
FIG. 10 discloses a projection metric for the Minimum Active Devices approach for 35 workloads allocated in 16 VMs (note that most of the VMs turned off during the entire simulation).
Figure 11:
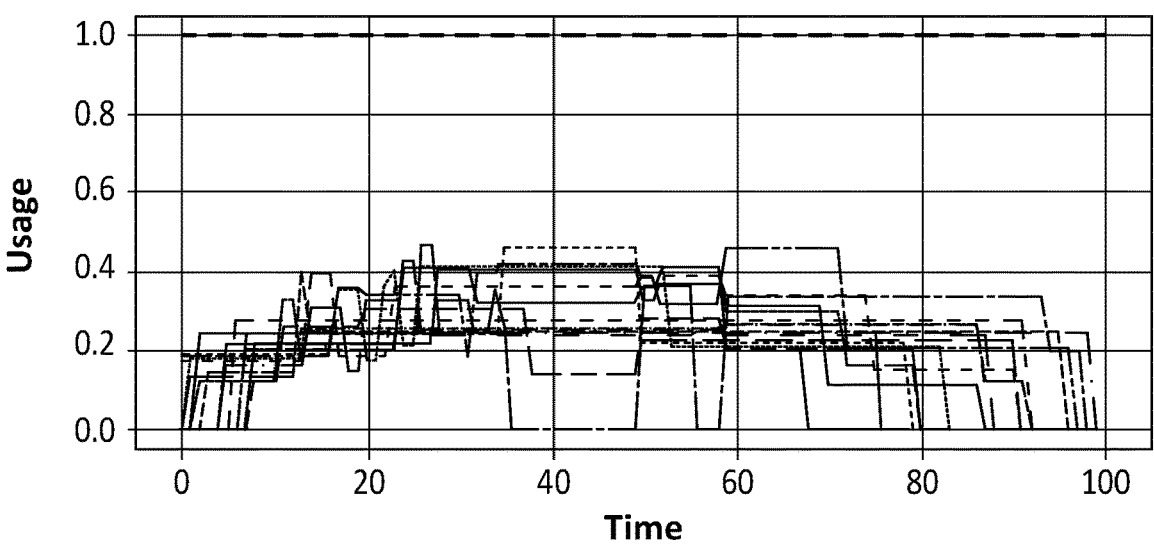
FIG. 11 discloses a projection metric for the Load Balance approach for 35 workloads allocated in 16 VMs.

With reference now to FIG. 3, an example algorithm, or method, 300 is presented for workload placement. By using a metric as described earlier, embodiments may operate to choose between two scenarios: the first scenario (i) prioritizes minimizing the number of devices working simultaneously, for different workloads, in the infrastructure, and the second scenario (ii) prioritizes maximizing the workload balance across the infrastructure.

To implement scenario (i), embodiments may aim to maximize the metric, that is, the length of the projection, since doing so would allocate as many resources as possible to a workload, and thus minimize the number of workers, such as VMs for example, or other resources, working on any other workloads. On the other hand, to implement scenario (ii), embodiments may aim to minimize the metric, that is, the length of the projection, since doing so would allocate as few resources as possible to the workload, and thus maximize the amount of workers, such as VMs, running for any other workloads. An example of the full workload placement framework is disclosed in FIG. 3.

In general, and given a list of workloads to be placed, a check 301 may be performed to determine if there are any further workloads in the list to be placed. If not, the method 300 may terminate. On the other hand, if one or more workloads remain in the list, the next workload to start, w, may be selected 302, and a list $L_{VMS}$ of VMs (virtual machines), built 304. As shown in FIG. 3, the operation 304 may comprise a subroutine 305 that may begin with the initialization 307 of an empty list of candidate infrastructures. Note that in the example of FIG. 3, a single VM is used as an example embodiment of an infrastructure, but the scope of the invention is not limited to any particular size, type, or configuration, of infrastructure. Thus, another example infrastructure may comprise multiple VMs that may be employed to execute one or more workloads.

With continued reference to FIG. 3, after the initialization 307, a determination 309 may be made indicating that there are still one or more VMs available to be added to the list. If this is the case, the next $VM_V$ may be selected 311 from the remaining available VMs in an infrastructure. For each available VM vi, the method 300 may compute and annotate 313 the projection metric and check 315 if there is room for all resources required by the workload w in vi and then append 317 vi to the list of VMs. At this point, the method 300 may return to 309 to repeat the subroutine until such time as there are no remaining VMs available.

Then, when it is determined at 309 that no further VMs are available to which part, or all, of a workload may be assigned, the method 300 may proceed to 306 where the list of VMs may be sorted according to various criteria. Examples of such criteria include, but are not limited to, the scenarios discussed elsewhere herein, namely, scenario (i) (Minimum Active Devices), or scenario (ii) (Load Balance). Thus, the capabilities of a particular VM, as indicated by the projection computed for that VM, may determine where that VM appears in the list of VMs. For example, VMs with relatively long projections may fit better with the implementation of scenario (i) where the aim is to minimize the number of VMs running for all workloads in the infrastructure. As another example, VMs with relatively shorter projections may be a better fit for implementation of scenario (ii) where the aim is to maximize the workload being handled in the infrastructure.

After the list of VMs has been sorted 306, the method 300 may continue with building 308 a Restrict Candidate List (RCL) which may comprise, for example, those VMs listed for one, or the other, of the criteria used to sort 306 the list. Finally, a VM may be randomly selected 310 from the RCL for placement the workload w. Once the workload is placed at some VM, the number of resources available is decreased from the VM vector representation before the next iteration. This guarantees that the VM resources representation is always updated considering the workloads running, and the resources consumed by those workloads.

C. Example Methods

It is noted with respect to the disclosed methods, including the example method 300 of FIG. 3, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

D. Further Discussion

As disclosed herein, example embodiments may provide various useful features and functionalities such as, for example, the composition of the representation, the metric, and the algorithm to orchestrate these workloads corresponds to a full pipeline for online workload placement tasks. As another example, embodiments may implement and employ the composition of representation of the workloads and infrastructures, the metric obtained from those representations, an algorithm for workload placement, which employs this metric and representation.

As another example, embodiments may implement a low-cost framework for Workload Placement. Particularly, embodiments may implement and use a low-cost framework for workload placement using a resource-based metric. This reduced framework does not rely on training the algorithm and may be easily extended for more resources and/or more VMs. Note as well that this framework may be easily implemented in a FaaS (Function as a Service) context since the framework may not rely on any trained data and all the input needed may be obtained in real-time from scanning the infrastructure.

As a final example, embodiments may provide reduced dimensionality for the MDBP Problem. Particularly, example embodiments may provide a way to avoid the dimensionality problem in multi-dimensional bin packing (MDBP) approaches. By using the disclosed metric, embodiments may reduce the space dimensionality to scalar values by using projections in representation space. This approach may be useful for other solutions related to MDBP problem.

E. Experimental Results

Example experimental results are disclosed in FIGS. 4-11. As shown the workload placement algorithm has been executed for both scenarios (Minimum Active Devices and Load Balance) with a different number of infrastructures. FIGS. 4-11 disclose the measurement of the resource usage of each VM according to the metric disclosed herein.

F. Further Example Embodiments

Following are some further example embodiments of the invention. These are presented only by way of example and are not intended to limit the scope of the invention in any way.

Embodiment 1. A method, comprising: determining a respective metric value for each computing resource in a group of computing infrastructures, and each metric value comprises a length of a Euclidean projection of a required resources vector in a respective vector of available resources provided by one of the computing infrastructures; creating a list that includes the computing infrastructures; sorting the list according to one of two criteria; creating a restricted candidates list that is a subset of the list; randomly selecting, from the restricted candidates list, one of the computing infrastructures; and executing, with whichever computing infrastructure was randomly selected, a workload associated with the required resources vector.

Embodiment 2. The method as recited in embodiment 1, wherein one or more of the computing infrastructures comprises a respective virtual machine.

Embodiment 3. The method as recited in any of embodiments 1-2, wherein the required resources vector identifies a type and amount of one or more resources needed to execute the workload.

Embodiment 4. The method as recited in any of embodiments 1-3, wherein the two criteria are (1) minimizing a number of computing infrastructures operating in a space that includes the computing infrastructures, and (2) maximizing a workload performed in the space.

Embodiment 5. The method as recited in embodiment 4, wherein the randomly selected computing infrastructure is selected in accordance with one or the other of the two criteria.

Embodiment 6. The method as recited in any of embodiments 1-5, wherein the computing infrastructures are included in a space that has 'n' resources available for execution of one or more workloads including the workload, and 'n' is any integer equal to, or greater than, two.

Embodiment 7. The method as recited in any of embodiments 1-6, wherein the length of the projection of w (the required resources vector) in v (the available resources vector) is: $\|\text{projvw}\|=(w\cdot v)/(\|v\|)$, where $\|v\|$ represents an L2-norm of v.

Embodiment 8. The method as recited in any of embodiments 1-7, wherein the two criteria are both a function of the respective length of the Euclidean projection of the required resources vector in the respective vector of available resources of one of the computing infrastructures.

Embodiment 9. The method as recited in embodiment 1, wherein a relatively longer Euclidean projection corresponds with a first one of the two criteria, and a relatively shorter Euclidean projection corresponds with a second one of the two criteria.

Embodiment 10. The method as recited in embodiment 9, wherein the first criteria is minimizing a number of computing infrastructures operating in a space that includes the computing infrastructures, and the second criteria is maximizing a workload performed in the space.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads.

While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 12:
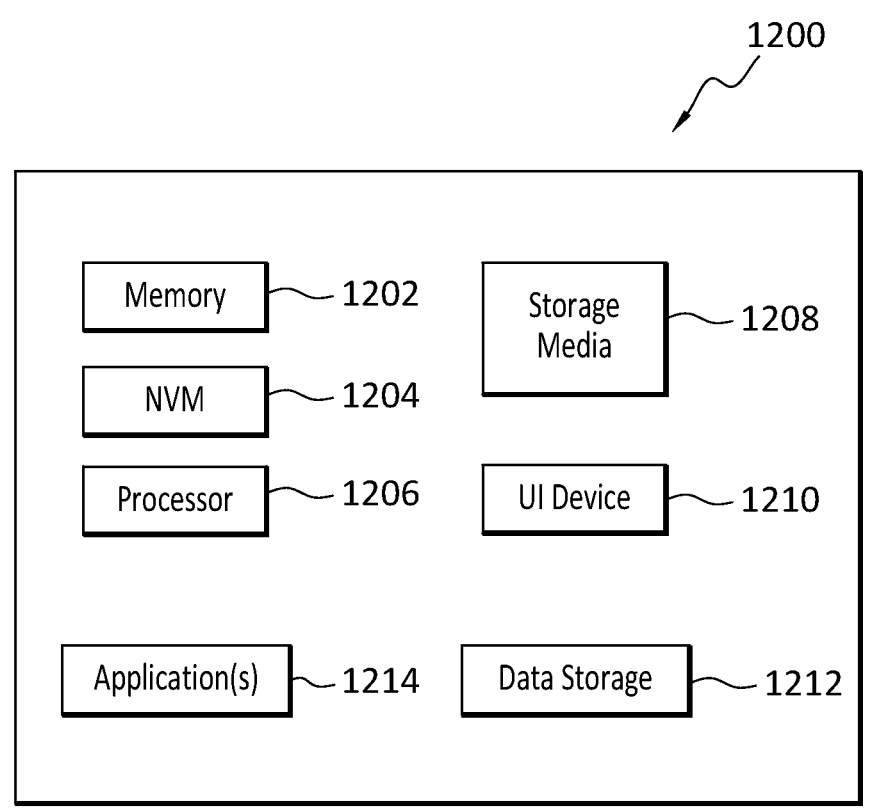
FIG. 12 discloses an example computing entity operable to perform any of the claimed methods, processes, and operations.

With reference briefly now to FIG. 12, any one or more of the entities disclosed, or implied, by FIGS. 1-11 and/or elsewhere herein, may take the form of, or include, or be implemented on, or hosted by, a physical computing device, one example of which is denoted at 1200. As well, where any of the aforementioned elements comprise or consist of a virtual machine (VM), that VM may constitute a virtualization of any combination of the physical components disclosed in FIG. 12.

In the example of FIG. 12, the physical computing device 1200 includes a memory 1202 which may include one, some, or all, of random access memory (RAM), non-volatile memory (NVM) 1204 such as NVRAM for example, read-only memory (ROM), and persistent memory, one or more hardware processors 1206, non-transitory storage media 1208, UI (user interface) device 1210, and data storage 1212. One or more of the memory components 1202 of the physical computing device 1200 may take the form of solid state device (SSD) storage. As well, one or more applications 1214 may be provided that comprise instructions executable by one or more hardware processors 1206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

creating a list that includes a group of computing infrastructures;

selecting a computing infrastructure from the list;

determining a respective metric value for each computing resource in the selected computing infrastructure by projecting a required resources vector for a current workload in an available resources vector of the selected computing infrastructure to obtain a projected point in the available resources vector, wherein each coordinate of the projected point corresponds to a respective metric value for each computing resource, and wherein each metric value represents an availability percentage of a corresponding computing resource for performing the current workload;

creating a restricted candidates list, which was initially an empty list;

adding, to the restricted candidates list, the selected computing infrastructure, an annotation of the respective metric value, and an annotation of checking whether there is room for all resources required by the workload in the selected computing infrastructure, in a case where a length of the projected point of the selected computing infrastructure meets two criteria;

randomly selecting, from the restricted candidates list, one of the computing infrastructures; and executing, with the randomly selected computing infrastructure, a next workload, wherein the required resources vector is based on the current workload and a related service level agreement, wherein a first one of the two criteria is to minimize a number of computing infrastructures operating in a space that includes the selected computing infrastructure, and a second of the two criteria is to maximize a workload performed in the selected computing infrastructure, wherein the two criteria are both a function of a respective length of the projection of the required resources vector in the respective available resources vector of one of the computing infrastructures, and wherein a length of the projection corresponding with the first one of the two criteria is longer than a length of the projection corresponding with the second one of the two criteria.

2. The method as recited in claim 1, wherein one or more of the computing infrastructures comprises a respective virtual machine.

3. The method as recited in claim 1, wherein the required resources vector identifies a type and amount of one or more resources needed to execute the current workload.

4. The method as recited in claim 1, wherein the randomly selected computing infrastructure is selected in accordance with the first one or the second one of the two criteria.

5. The method as recited in claim 1, wherein the computing infrastructures are included in a space that has 'n' resources available for execution of one or more workloads including the current workload, and 'n' is any integer equal to, or greater than, two.

6. The method as recited in claim 1, wherein a length of the projection of w (the required resources vector) in v (the available resources vector) is: $\|projvw\|=(w\cdot v)/(\|v\|)$, where $\|v\|$ represents an L2-norm of v.

7. A non-transitory storage medium having stored therein instructions that are executable by one or more hardware processors to perform operations comprising:

creating a list that includes a group of computing infrastructures;

selecting a computing infrastructure from the list;

determining a respective metric value for each computing resource in the selected computing infrastructure by projecting a required resources vector for a current workload in an available resources vector of the selected computing infrastructure to obtain a projected point in the available resources vector, wherein each coordinate of the projected point corresponds to a respective metric value for each computing resource, and wherein each metric value represents an availability percentage of a corresponding computing resource for performing the current workload;

creating a restricted candidates list, which was initially an empty list;

adding, to the restricted candidates list, the selected computing infrastructure, an annotation of the respective metric value, and an annotation of checking whether there is room for all resources required by the workload in the selected computing infrastructure, in a case where a length of the projected point of the selected computing infrastructure meets two criteria;

randomly selecting, from the restricted candidates list, one of the computing infrastructures; and executing, with the randomly selected computing infrastructure, a next workload, wherein the required resources vector is based on the current workload and a related service level agreement, wherein a first one of the two criteria is to minimize a number of computing infrastructures operating in a space that includes the selected computing infrastructure, and a second of the two criteria is to maximize a workload performed in the selected computing infrastructure, wherein the two criteria are both a function of a respective length of the projection of the required resources vector in the respective available resources vector of one of the computing infrastructures, and wherein a length of the projection corresponding with the first one of the two criteria is longer than a length of the projection corresponding with the second one of the two criteria.

8. The non-transitory storage medium as recited in claim 7, wherein one or more of the computing infrastructures comprises a respective virtual machine.

9. The non-transitory storage medium as recited in claim 7, wherein the required resources vector identifies a type and amount of one or more resources needed to execute the current workload.

10. The non-transitory storage medium as recited in claim 7, wherein the randomly selected computing infrastructure is selected in accordance with the first one or the ether second one of the two criteria.

11. The non-transitory storage medium as recited in claim 7, wherein the computing infrastructures are included in a space that has 'n' resources available for execution of one or more workloads including the current workload, and 'n' is any integer equal to, or greater than, two.

12. The non-transitory storage medium as recited in claim 7, wherein a length of the projection of w (the required resources vector) in v (the available resources vector) is: $\|\mathrm{proj}vw\| = (w \cdot v)/(\|v\|)$, where $\|v\|$ represents an L2-norm of v.

* * * * *